(12) United States Patent
Uchimura

(10) Patent No.: US 7,859,149 B2  
(45) Date of Patent: Dec. 28, 2010

(54) ELECTRIC MOTOR AND METHOD OF MANUFACTURING THE SAME

(75) Inventor: Hiroyuki Uchimura, Kiryu (JP)

(73) Assignee: MITSUBA Corporation, Kiryu-shi (JP)

( * ) Notice: Subject to any disclaimer, the term of this patent is extended or adjusted under 35 U.S.C. 154(b) by 293 days.

(21) Appl. No.: 12/088,266

(22) PCT Filed: Sep. 15, 2006

(86) PCT No.: PCT/JP2006/318426

§ 371 (c)(1),  
(2), (4) Date: Mar. 27, 2008

(87) PCT Pub. No.: WO2007/037141

PCT Pub. Date: Apr. 5, 2007

(65) Prior Publication Data

US 2009/0146510 A1    Jun. 11, 2009

(30) Foreign Application Priority Data

Sep. 29, 2005    (JP) .............................. 2005-284835

(51) Int. Cl.  
*H02K 11/00* (2006.01)

(52) U.S. Cl. ...................... 310/71; 310/68 B; 310/233; 310/239; 310/248

(58) Field of Classification Search ............... 310/68 B, 310/71, 233, 239, 248; *H02K 11/00*  
See application file for complete search history.

(56) References Cited

U.S. PATENT DOCUMENTS 5,528,093 A * 6/1996 Adam et al. ................... 310/89  
6,550,599 B2 * 4/2003 Kudou et al. .............. 192/223.2  
6,577,030 B2 * 6/2003 Tominaga et al. .......... 310/68 B  
6,707,188 B2   3/2004 Torii et al.  
6,727,613 B2 * 4/2004 Kawakami et al. ........ 310/75 R (Continued)

FOREIGN PATENT DOCUMENTS

JP    2002-034207    1/2002

(Continued)

OTHER PUBLICATIONS

International Search Report dated Nov. 29, 2006 for International Application No. PCT/JP2006/318426 (4 pages).

(Continued)

*Primary Examiner*—Quyen Leung  
*Assistant Examiner*—John K Kim  
(74) *Attorney, Agent, or Firm*—McCormick, Paulding & Huber LLP

(57) ABSTRACT

Assembly work of an electric motor in which a power supply device and a rotation detector both equipped in a motor case are connected to a control device via a connector unit can be made easy. A power window motor includes an armature provided with an armature shaft and a motor yoke rotatably accommodating the armature. A gear case is fixed to the motor yoke, and a power supply unit that supplies a driving current to the armature is equipped to the gear case in the axial direction of the armature shaft. A sensor unit that detects rotation of the armature shaft is attached to the power supply unit in the axial direction of the armature shaft. A connector unit for connecting the power supply unit and the sensor unit to the control device is integrally formed with the power supply unit. The power supply unit is attached with the sensor unit in advance and then equipped to the gear case.

7 Claims, 9 Drawing Sheets

U.S. PATENT DOCUMENTS

| | | | |
|---|---|---|---|
| 6,819,019 B2 | 11/2004 | Tamura et al. | |
| 6,992,414 B2* | 1/2006 | Thomson et al. | 310/71 |
| 7,038,337 B2 | 5/2006 | Thomson et al. | |
| 7,705,498 B2* | 4/2010 | Ortoman et al. | 310/68 B |
| 2001/0047916 A1 | 12/2001 | Kudou et al. | |
| 2002/0047347 A1 | 4/2002 | Torii et al. | |
| 2002/0060105 A1* | 5/2002 | Tominaga et al. | 180/443 |
| 2003/0137202 A1* | 7/2003 | Mao et al. | 310/68 R |
| 2003/0178908 A1* | 9/2003 | Hirano et al. | 310/239 |
| 2004/0021379 A1* | 2/2004 | Breynaert et al. | 310/68 B |
| 2004/0061391 A1* | 4/2004 | Matsuyama et al. | 310/71 |
| 2005/0082925 A1* | 4/2005 | Yamamoto et al. | 310/89 |
| 2006/0011012 A1* | 1/2006 | Matsuyama | 74/606 R |
| 2006/0113852 A1* | 6/2006 | Adachi et al. | 310/71 |
| 2009/0146510 A1* | 6/2009 | Uchimura | 310/42 |

FOREIGN PATENT DOCUMENTS

| | | |
|---|---|---|
| JP | 2002-034207 A | 1/2002 |
| JP | 2002-061719 | 2/2002 |
| JP | 2002-061719 A | 2/2002 |
| JP | 2003-061311 | 2/2003 |
| JP | 2003-061311 A | 2/2003 |
| JP | 2005-160195 | 6/2005 |
| JP | 2005-160195 A | 6/2005 |
| JP | 2007-097339 | 4/2007 |
| JP | 2007-097399 A | 4/2007 |
| WO | 01/89064 A1 | 11/2001 |
| WO | 0189064 A1 | 11/2001 |

OTHER PUBLICATIONS

Written Opinion of the International Searching Authority dated Dec. 5, 2006 for International Application No. PCT/JP2006/318426 (4 pages).

International Search Report for PCT/JP2006/318426 dated Nov. 29, 2006.

* cited by examiner

THE SHAFT DIRECTION OF THE ARMATURE SHAFT

ELECTRIC MOTOR AND METHOD OF MANUFACTURING THE SAME

CROSS REFERENCE TO RELATED APPLICATIONS

This application is entitled to the benefit of and incorporates by reference essential subject matter disclosed in International Patent Application No. PCT/JP2006/318426 filed on Sep. 15, 2006 and Japanese Patent Application No. 2005-284835 filed Sep. 29, 2005.

TECHNICAL FIELD

The present invention relates to an electric motor that includes an armature having a rotary shaft and rotatably accommodated in the inside of a motor case, and more particularly, to an electric motor in which a rotation detector to detect rotation of a rotary shaft is provided in the inside of a motor case.

BACKGROUND ART

An electric motor has been widely used as a drive source for various devices such as electrical components of an automobile. For example, in a power window system provided to a door of an automobile and the like, an electric motor having a decelerator is fixed in the inside of the door and a window glass is automatically opened/closed by operating a regulator by this electric motor.

The electric motor described above has an armature provided with a rotary shaft and a motor case accommodating the armature rotatably. A power supply device for supplying a driving current to the armature is equipped in the inside of the motor case. The power supply device is provided with a brush holder fixed to the motor case and a power supply unit, that is, brushes held in the brush holder, and the brushes come into contact with a commutator fixed to the rotary shaft. When a driving current is supplied from a control device to the brushes, the driving current is supplied to an armature coil of the armature via the commutator and a magnetic force is generated between magnets and the armature fixed to the inner surface of the motor case, thereby allowing the armature to rotate.

As such an electric motor, an electric motor is known in which a rotation detector that detects rotation of a rotary shaft is equipped inside the motor case in order to control speed and positioning of driven members such as window glass. In this case, a sensor magnet including a number of polarized magnetic poles is fixed to the rotary shaft in the peripheral direction, rotation sensors such as Hall elements disposed opposite to the sensor magnet are provided to the rotation detector, and the rotation sensors detect rotation of the rotary shaft from changes of the magnetic field of the sensor magnets associated with the rotation of the rotary shaft. Detection results from the rotation sensors are input to a control device and the operation of the electric motor is controlled by the control device based on the rotation of the rotary shaft detected by the rotation sensors, thereby controlling speed and positioning of the window glass.

On the other hand, an electric motor is known in which a connector unit for connecting a power supply device and a rotation detector to a control device is integrally provided with a motor case. For example, in Patent document 1, an electric motor is disclosed in which a power supply device and a rotation detector are sequentially equipped inside a motor case in the axial direction of a rotary shaft, a terminal unit of each device is disposed at an opening portion formed in the motor case, a sub-coupler is equipped inside the opening portion in the direction orthogonal to the rotary shaft, this sub-coupler is connected to the terminal units of the power supply device and the rotation detector, and the terminal units integrally compose a connector unit with the motor case. This connector unit is connected to a connector on the side of a control device, which allows brushes and rotation sensors to be connected to the control device.

Patent document 1: SAIKOHYO (translation of PCT) 01-89064

However, in order to form a connector unit in a motor case in such an electric motor as the one disclosed in Patent document 1, it is necessary to equip a power supply device and a rotation detector as well as a sub-coupler in a motor case. Further, since an assembly direction of the sub-coupler is offset by 90 degrees in relation to the assembly direction of the power supply device and the rotation detector to the motor case, the assembly workability of this electric motor is not good, and therefore improvement of the workability has been desired.

DISCLOSURE OF THE INVENTION

An object of the present invention is to make assembly work of an electric motor easy in which a power supply device and a rotation detector equipped inside a motor case are connected to a control device via a connector unit.

An electric motor according to the present invention is in which an armature provided with an armature shaft is rotatably accommodated in the inside of a motor case, comprising: a power supply device that is equipped in the motor case in the axial direction of the armature shaft and supplies a driving current to the armature; a rotation detector that is accommodated in the motor case together with the power supply device and detects rotation of the armature shaft; and a connector unit that is integrally formed with the power supply device, connected to a connector on the side of a control device, and connects the power supply device and the rotation detector to the control device, in which the power supply device is equipped to the motor case after the rotation detector is attached to the power supply device in advance.

The electric motor according to the present invention is such that in which the power supply device includes a holder fixed to the motor case, a power supply unit that supplies power to the armature held in the holder, and an attachment unit that is integrally formed with the holder and attached with the rotation detector, and the attachment unit is disposed offset from the power supply unit in the axial direction of the armature shaft.

The electric motor according to the present invention is such that in which a coupling unit is provided between the holder and the connector unit, and the attachment unit is disposed on the opposite side of the sandwiched coupling unit to the power supply unit in the axial direction of the armature shaft.

The electric motor according to the present invention is such that, in which the holder is formed of a resin material, and terminal members for power supply that connect the connector unit and the power supply device and terminal members for rotation detection that connect the connector unit and the rotation detector are embedded in the holder.

The electric motor according to the present invention is such that, in which when end portions of the terminal members for rotation detection protrude from the attachment unit in the axial direction of the armature shaft and when the rotation detector is attached to the attachment unit in the axial direction of the armature shaft, the terminal members for rotation detection are electrically connected to the rotation detector.

A method for manufacturing an electric motor according to the present invention is including an armature that is provided with a armature shaft, a motor case that rotatably accommodates the armature, a power supply device that supplies a driving current to the armature, a rotation detector that detects rotation of the armature shaft, and a connector unit that is integrally formed with the power supply device, connected to a connector on the side of a control device, and connects the power supply device and the rotation detector to the control device, the method comprising: a step of attaching the rotation detector to the power supply device in the axial direction of the armature shaft; and a step of equipping the power supply device attached with the rotation detector in advance to the motor case in the axial direction of the armature shaft.

BEST MODE FOR CARRYING OUT THE INVENTION

Hereinafter, embodiments of the present invention will be explained in detail with reference to the drawings.

Figure 1:
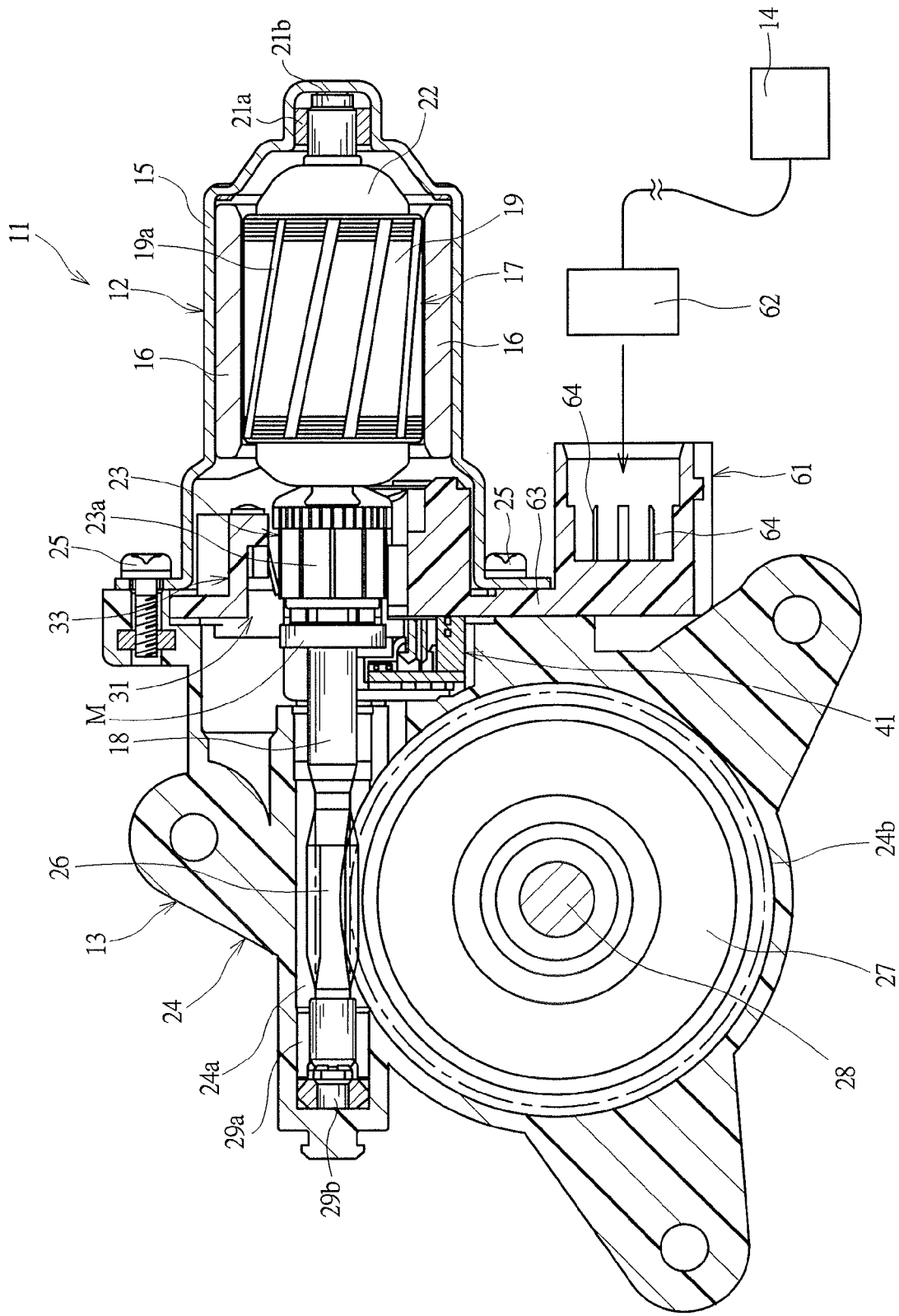
FIG. 1 is a cross sectional view representing a power window motor that is an embodiment of the present invention.

A power window motor 11 shown in FIG. 1 is used as a drive source of a power window system in a vehicle not shown and is an electric motor with a so-called decelerator in one unit where a decelerator 13 is attached to a motor main body 12. The power window system is provided with a control device 14, and the power window motor 11 is connected to the control device 14. Operation of the power window motor 11 is controlled by a driving current supplied from the control device 14 and a window glass is automatically opened and closed.

The motor main body 12 is a direct-current motor with so-called brushes. A pair of permanent magnets 16 (magnets) are fixed to an inner circumferential surface of a cylindrical motor yoke 15 having a bottom in an oval shape in cross section, and an armature 17 is accommodated in the inside of the motor yoke 15 so as to face the permanent magnets 16. The armature 17 has a rotary shaft 18 (armature shaft) and an armature core 19 that is fixed to the armature shaft 18. The armature 17 is rotatable about the armature shaft 18 as the axis in the inside of the motor yoke 15 by supporting one end of the armature shaft 18 by radial bearings 21a and a thrust bearing 21b that are provided to a bottom wall portion of the motor yoke 15. A plurality of slits 19a are formed in the armature core 19, and the armature core 19 via the slits 19a is wound with an armature coil 22. Further, adjacently to the armature core 19, a commutator 23 is fixed to the armature shaft 18, and the armature coil 22 is electrically connected to corresponding commutator pieces 23a of the commutator 23.

On the other hand, the decelerator 13 has a gear case 24. The gear case 24 is fixed to an opening portion of the motor yoke 15 by fastening members 25 to block the opening portion of the motor yoke 15, and a motor case is formed with the motor yoke 15 and the gear case 24. The armature shaft 18 of the motor main body 12 protrudes from the motor yoke 15. In order to rotatably accommodate the armature shaft 18 protruding from the motor yoke 15, a cylindrical shaft accommodation unit 24a is formed in the gear case 24, and the other end of the armature shaft 18 is supported by radial bearings 29a and a thrust bearing 29b. A worm 26 is integrally provided to an outer circumferential surface of the portion of the shaft accommodation unit 24a in which the armature shaft 18 is accommodated. A worm wheel 27 that engages with the worm 26 is rotatably accommodated in a gear accommodation unit 24b formed in the gear case 24. An output shaft 28 is fixed to the shaft centre of the worm wheel 27, and an end of the output shaft 28 protrudes from the gear case 24 and is coupled to the window glass via a regulator not shown. Therefore, when the motor main body 12 is operated to rotate the armature shaft 18, the number of the rotation is decreased to a predetermined number by the worm 26 and the worm wheel 27, and the decreased number of rotation is output from the output shaft 28. When the output shaft 28 rotates, the window glass is driven to open and close via the regulator.

In order to operate the motor main body 12 by supplying a driving current to the armature 17, a power supply unit 31 is provided to the power window motor 11 as a power supply device. The power supply unit 31 is equipped to the gear case 24 in the axial direction of the armature shaft 18, and the gear case 24 is fixed to the motor yoke 15, thereby accommodating the power supply unit 31 in the inside of the motor yoke 15 in a state of sandwiching it between the motor yoke 15 and the gear case 24. A detail of the method for equipping the power supply unit 31 to the gear case 24 will be described later.

Figure 2:
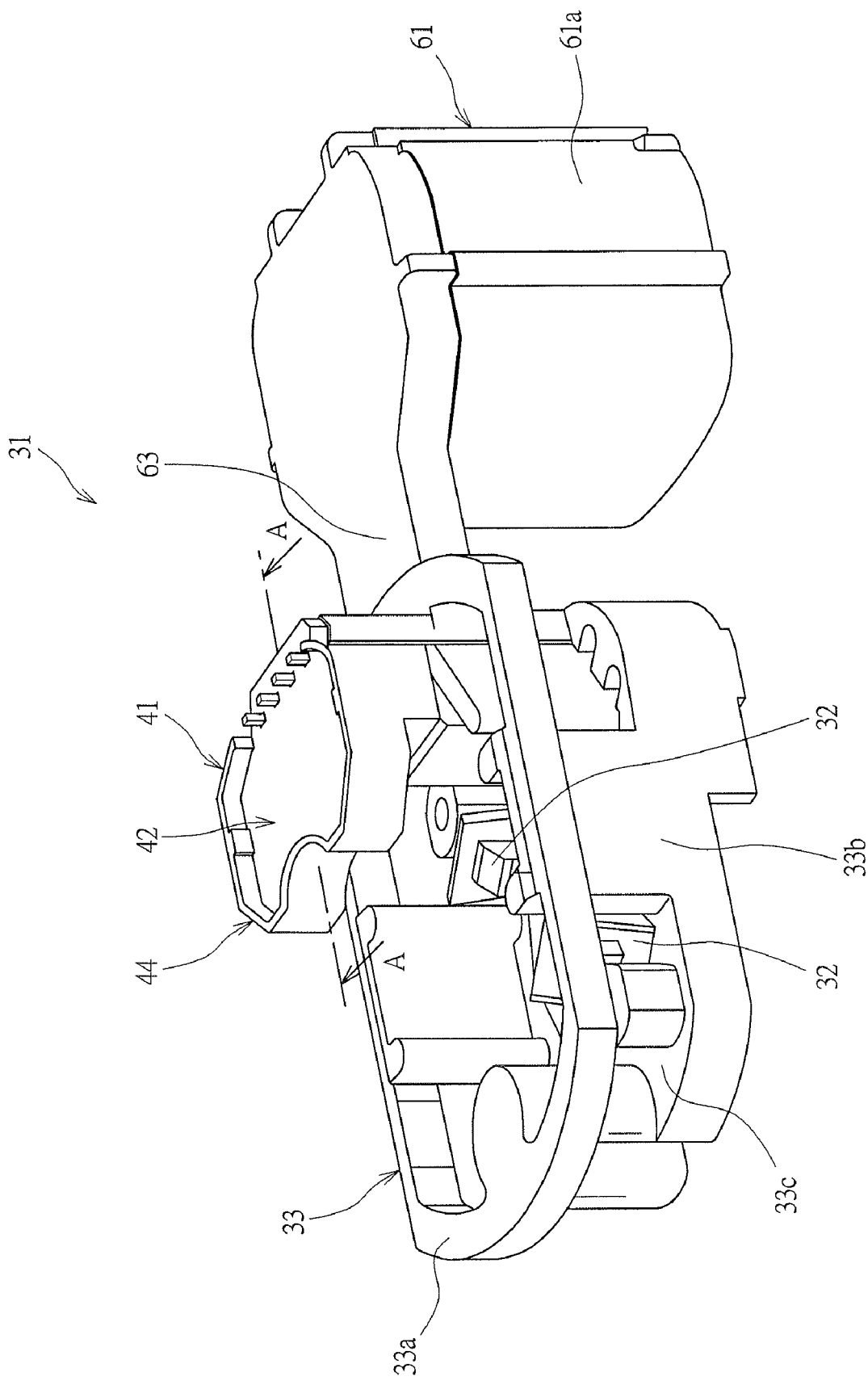
FIG. 2 is a perspective view representing a detail of the power supply unit shown in FIG. 1.
Figure 3:
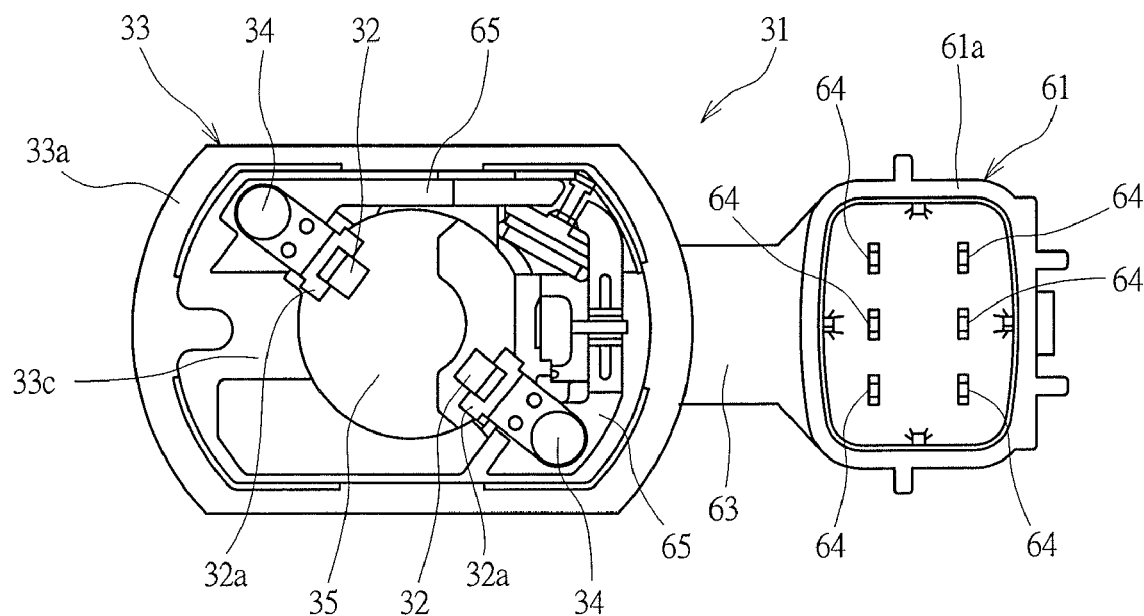
FIG. 3 is a bottom plan view of the power supply unit shown in FIG. 2.

FIG. 2 is a perspective view that represents a detail of the power supply unit shown in FIG. 1. FIG. 3 is a bottom plan view of the power supply unit shown in FIG. 2. The power supply unit 31 is provided with a pair of brushes 32 as a power supply unit and a holder, that is, a brush holder 33 to hold the brushes 32. The brush holder 33 is formed by injection molding a resin material and includes a ring portion 33a, a side wall portion 33b that extends from the ring portion 33a in the axial direction of the armature shaft 18, and a plane portion 33c that extends from an end on the side opposite to the ring portion 33a of the side wall portion 33b in the direction vertical to the axial direction of the armature shaft 18. The ring portion 33a is formed in an approximately annular oval shape along an end of the opening of the motor yoke 15. The ring portion 33a is sandwiched between the motor yoke 15 and the gear case 24, thereby fixing the brush holder 33 to the gear case 24 and the motor yoke 15. Further, each brush 32 is attached to one end of each plate spring 32*a*, and the other end of the plate spring 32*a* is supported on the plane portion 33*c* of the brush holder 33 by each fastening member 34 so as to allow the elasticity of the plate spring 32*a* to vary. When the brush holder 33 is fixed to the motor yoke 15 and the gear case 24, the brushes 32 are slidably contact with the outer circumferential surface of the armature 23 elastically. When a driving current is supplied to the brushes 32, the driving current is supplied to the armature coil 22 via the commutator 23. Note that a through-hole 35 is formed in the center portion of the plane portion 33*c*, and the armature shaft 18 is inserted through the through-hole 35 and protrudes to the side of the shaft accommodation unit 24*a* in relation to the brush holder 33.

In order to detect rotation of the armature shaft 18, a sensor unit 41 is provided to the power window motor 11 as a rotation detector. Before the power supply unit 31 is equipped to the gear case 24, the sensor unit 41 is attached to the power supply unit 31 in the axial direction of the armature shaft 18, and then equipped to the gear case 24 in a state of integration with the power supply unit 31. A detail of the method for equipping the sensor unit 41 to the gear case 24 will be described later.

Figure 4:
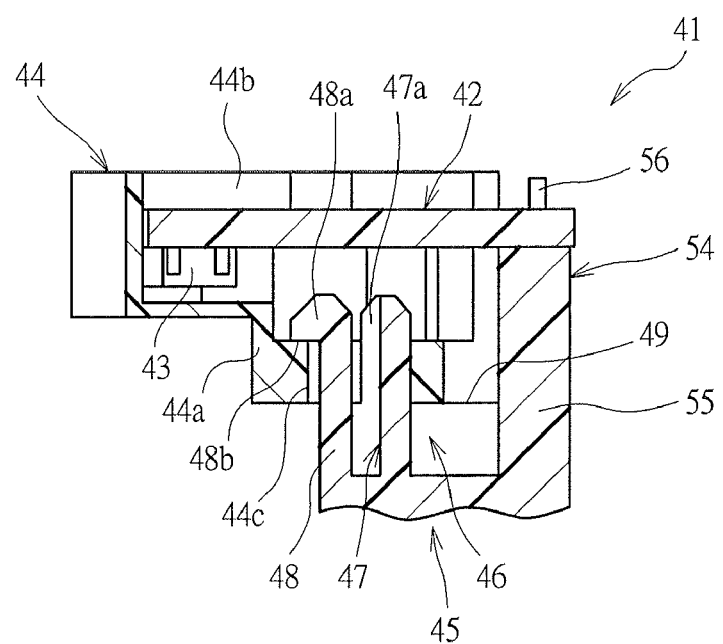
FIG. 4 is a cross sectional view cut along the A-A line in FIG. 2.
Figure 5:
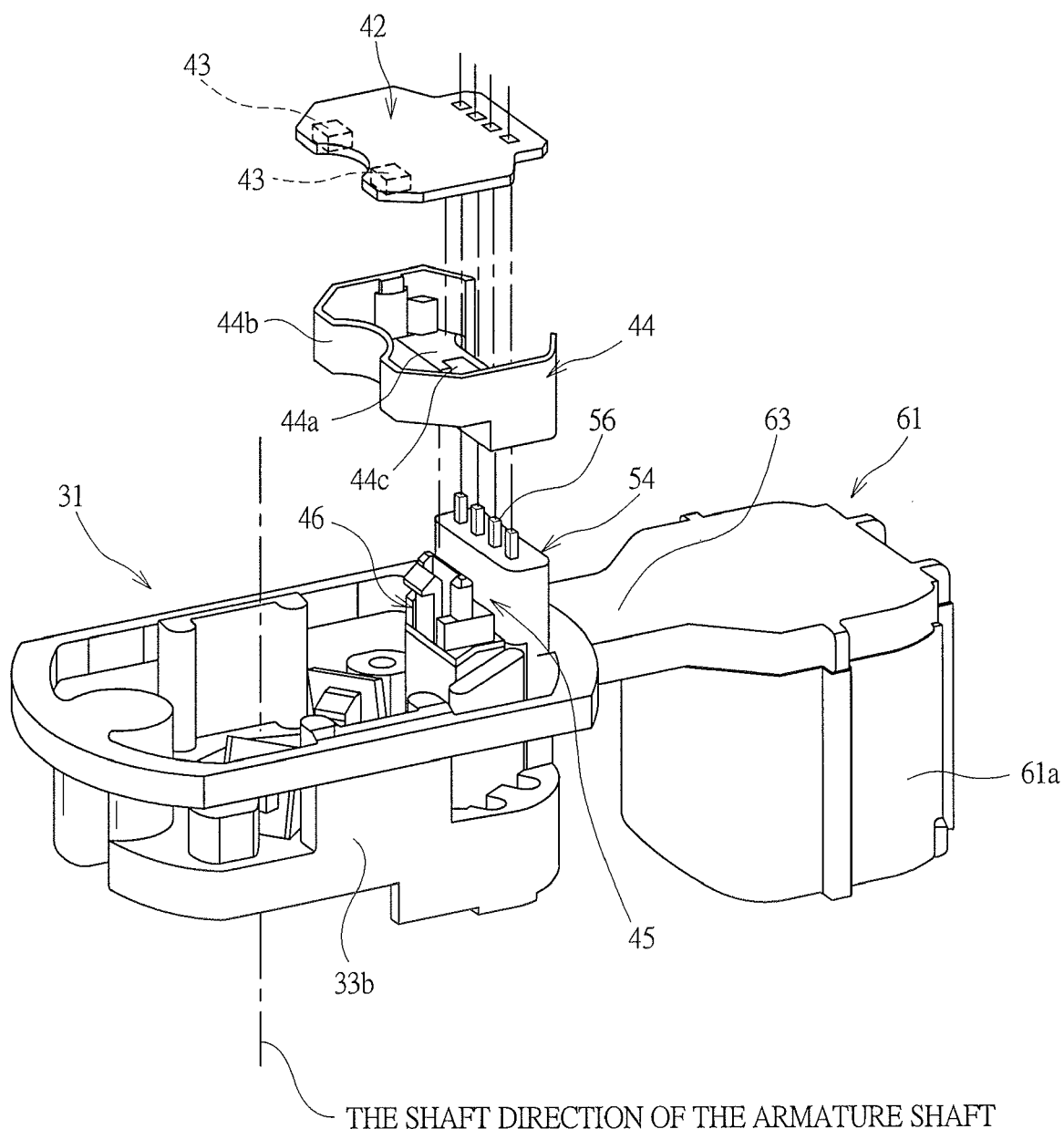
FIG. 5 is an exploded perspective view of the sensor unit shown in FIG. 2.
Figure 6:
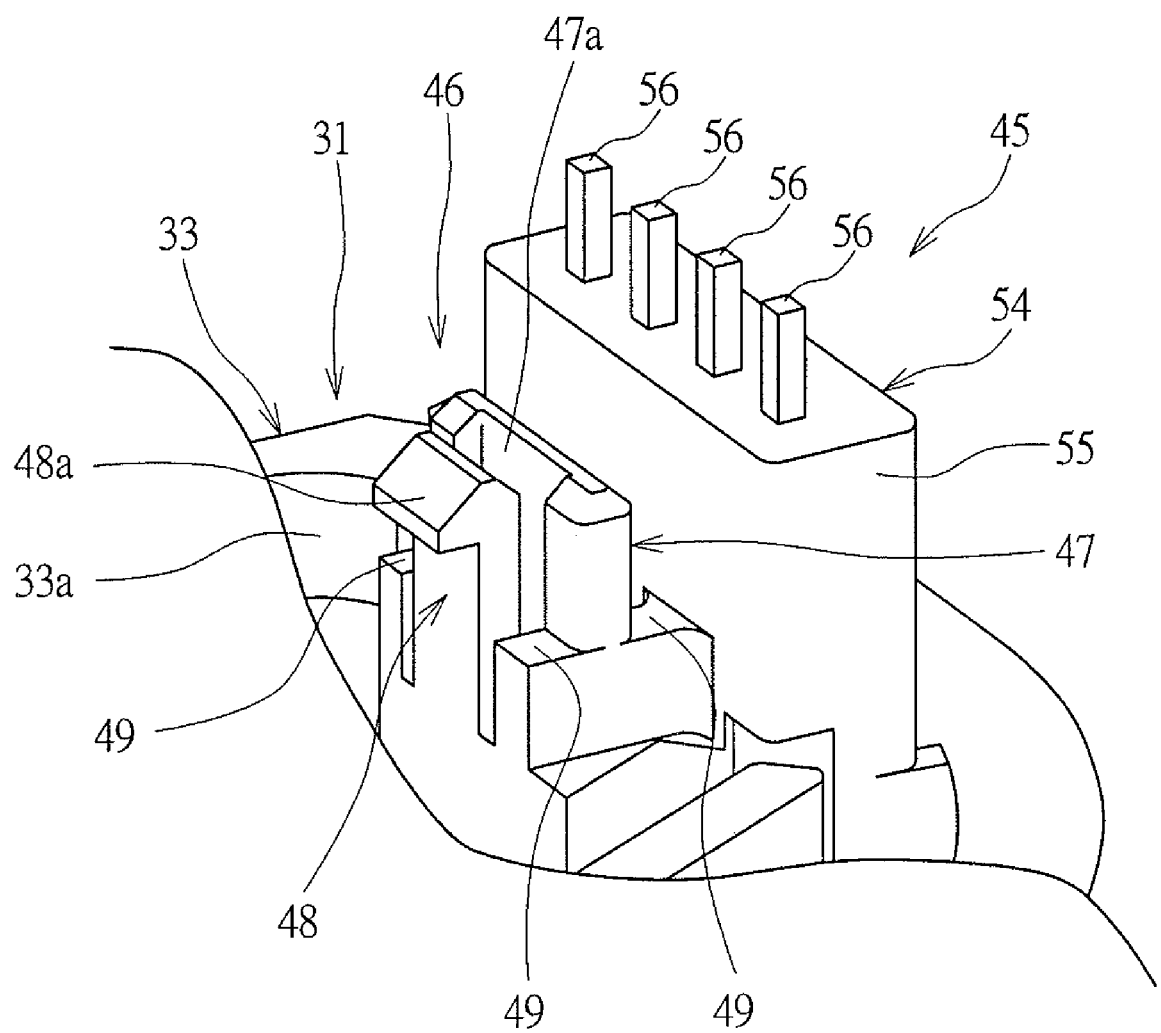
FIG. 6 is a perspective view representing a detail of the attachment unit shown in FIG. 5.
Figure 7A:
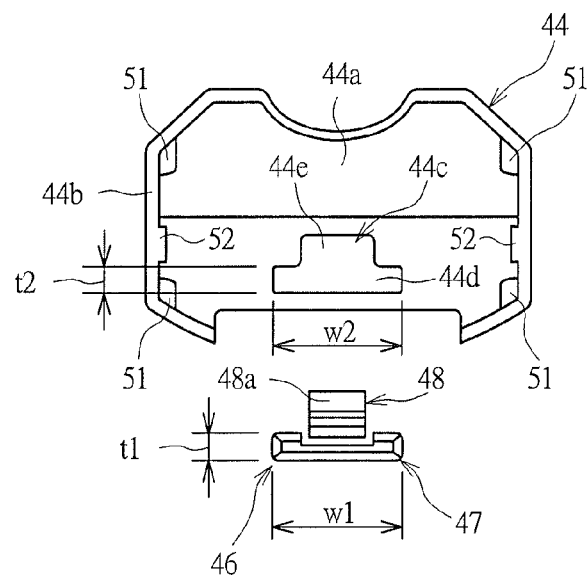
FIG. 7A is a detailed diagram to explain an attachment hole formed in a sensor case.
Figure 7B:
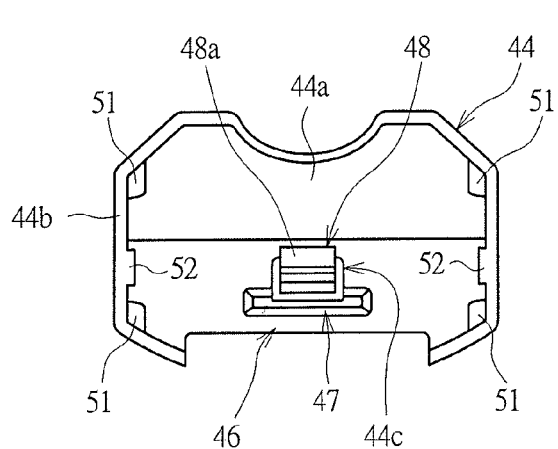
FIG. 7B is a detailed diagram to explain a state of engagement of a case fixing unit with the attachment hole.
Figure 8:
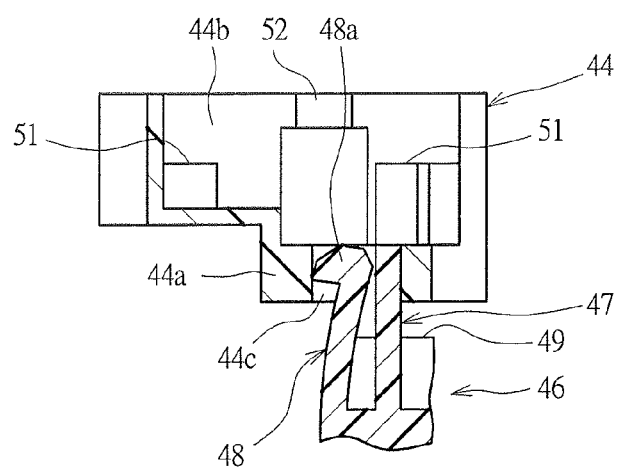
FIG. 8 is a cross sectional view representing a state of a locking piece at the time of attachment of the sensor case.

FIG. 4 is a cross sectional view cut along the A-A line in FIG. 2. FIG. 5 is an exploded perspective view of the sensor unit shown in FIG. 2. FIG. 6 is a perspective view that represents a detail of the attachment unit shown in FIG. 5. FIG. 7A is a detailed diagram to explain an attachment hole formed in a sensor case, and FIG. 7B is a detailed diagram to explain a state of engagement of a case fixing unit with the attachment hole. FIG. 8 is a cross sectional view that represents a state of a locking piece at the time of attaching the sensor case.

The sensor unit 41 includes two rotation sensors 43 mounted on a sensor substrate 42 and a synthetic resin sensor case 44 that accommodates these rotation sensors 43 together with the sensor substrate 42. For the rotation sensors 43, for example, Hall elements are used. Each rotation sensor 43 faces at a predetermined position to a sensor magnet M that is a detected body fixed to the armature shaft 18, is disposed such that both of the rotation sensor 43 and the sensor magnet M are in out-of-phase with each other by 90 degrees, and outputs pulse signal in a cycle proportional to the number of rotation of the armature shaft 18 according to a change of the magnetic poles that is generated in association with rotation of the armature shaft 18.

On the other hand, the sensor case 44 is formed in a bathtub shape including a bottom wall portion 44*a* and a side wall portion 44*b*, and an attachment hole 44*c* is provided in the bottom wall portion 44*a*. As shown in FIG. 7A, the attachment hole 44*c* has a large width portion 44*d* formed in an approximately rectangular shape and a small width portion 44*e* whose width is smaller than that of the large width portion 44*d*, which makes the attachment hole approximately convex overall.

In order to attach the sensor unit 41, an attachment unit 45 is provided to the brush holder 33. The attachment hole 44*c* of the sensor case 44 is engaged with a case fixing unit 46 provided to the attachment unit 45, thereby integrally fixing the sensor unit 41 to the brush holder 33. The sensor unit 41 is fixed to the brush holder 33, that is, the sensor unit 41 is attached to the power supply unit 31, thereby positioning the sensor unit 41 in the gear case 24 via the power supply unit 31.

In other words, the sensor unit 41 is positioned at a predetermined position in relation to the sensor magnet M fixed to the armature shaft 18.

As shown in FIG. 6, the attachment unit 45 is integrally formed of a resin material with the brush holder 33 and is disposed on the side of the inner circumference of the ring portion 33*a* of the brush holder 33 so as to protrude to the side opposite to the side wall portion 33*b*. In other words, the attachment unit 45 is disposed offset from the brushes 32 that are a power supply unit in the axial direction of the armature shaft 18.

The case fixing unit 46 provided to the attachment unit 45 is provided to fix the sensor case 44 to the brush holder 33 and includes a positioning block 47 protruding from the ring portion 33*a* in the axial direction of the armature shaft 18 and a locking piece 48 parallel to the positioning block 47. A concave portion 47*a* is formed on one side surface of the positioning block 47 that is the side facing the locking piece 48. This makes the cross section of the positioning block 47 U-shaped. A positioning surface 49 perpendicular to the armature shaft 18 is formed on the base portion of the locking piece 48 and the positioning block 47. As shown in FIG. 7A, a width dimension w1 and a thickness dimension t1 of the positioning block 47 are set approximately the same as a width dimension w2 and a thickness dimension t2, respectively, of the large width portion 44*d* of the attachment hole 44*c*. Owing to this, when the positioning block 47 is inserted through the large width portion 44*d* of the attachment hole 44*c*, the inner circumferential surface of the large width portion 44*d* comes into contact with each side surface of the positioning block 47 as shown in FIG. 7B, and the sensor case 44 is positioned by the positioning block 47 to the inside of the surface perpendicular to the armature shaft 18, that is, in the direction perpendicular to the attachment direction.

On the other hand, a claw portion 48*a* protruding to the side opposite to the concave portion 47*a* is provided to an end of the locking piece 48, and this locking piece 48 is inserted through the small width portion 44*e* of the attachment hole 44*c*. A lower surface of the bottom wall portion 44*a* of the sensor case 44 comes into contact with the positioning surface 49 and a lower surface 48*b* of the claw portion 48*a* is engaged with an upper surface of the bottom wall portion 44*a* of the sensor case 44. This allows the bottom wall portion 44*a* to be sandwiched between the positioning surface 49 and the lower surface 48*b* of the claw portion 48*a* and fixed to the attachment unit 45. In other words, not only is the sensor case 44 positioned in the axial direction of the armature shaft 18 by coming into contact with the positioning surface 49 and the lower surface 48*b* of the claw portion 48*a* but also coming-off from the attachment unit 45 is prevented by the engagement with the claw portion 48*a* of the locking piece 48, thereby positioning the sensor case 44 in the axial direction of the armature shaft 18, that is, in the attachment direction in relation to the brush holder 33.

The locking piece 48 is disposed so as to position part thereof in the inside of the concave portion 47*a* of the positioning block 47 and there is a predetermined space between the locking piece 48 and the positioning block 47. Owing to this, the locking piece 48 can be elastically deformed in the direction perpendicular to the side of the positioning block 47, that is, in the attachment direction until the locking piece 48 comes into contact with the positioning block 47 in the concave portion 47*a*. As described above, a margin to bend the locking piece 48 is formed in the concave portion 47*a*. When the sensor case 44 is equipped to the case fixing unit 46, the locking piece 48 is inserted to the side of the concave portion 47*a* through the attachment hole 44*c* while being elastically deformed as shown in FIG. 8. When the claw portion 48a has passed through the attachment hole 44c, the locking piece 48 returns to its original shape and then the claw portion 48a engages with the bottom wall portion 44a.

Here, in the case fixing unit 46, the concave portion 47a is provided in the area where the locking piece 48 of the positioning block 47 is elastically deformed, and the locking piece 48 can be disposed closer to the side of the positioning block 47 by the deformation. Therefore, the case fixing unit 46 can be downsized and the layout of each unit provided to the case fixing unit 46 and brush holder 33 can be enhanced. Further, the locking piece 48 comes into contact with the positioning block 47 in the concave portion 47a, thereby restricting more elastic deformation; therefore, it is possible to prevent the locking piece 48 from being elastically deformed more than necessary and broken by an external force. Furthermore, by downsizing the case fixing unit 46, the attachment unit 44c provided to the sensor case 44 can be made small and it will be easy to keep the rigidity of the sensor case 44 at more than a certain value.

In the power window motor 11, the positioning block 47 provided with the concave portion 47a is formed in a U-shape in cross section and part of the locking piece 48 is disposed in the inside of the concave portion 47a of the positioning block 47 as described above; therefore, the attachment unit 45 can be downsized and the layout of each unit provided to the attachment unit 45 and the brush holder 33 can be enhanced to make the power window motor 11 small.

Figure 9:
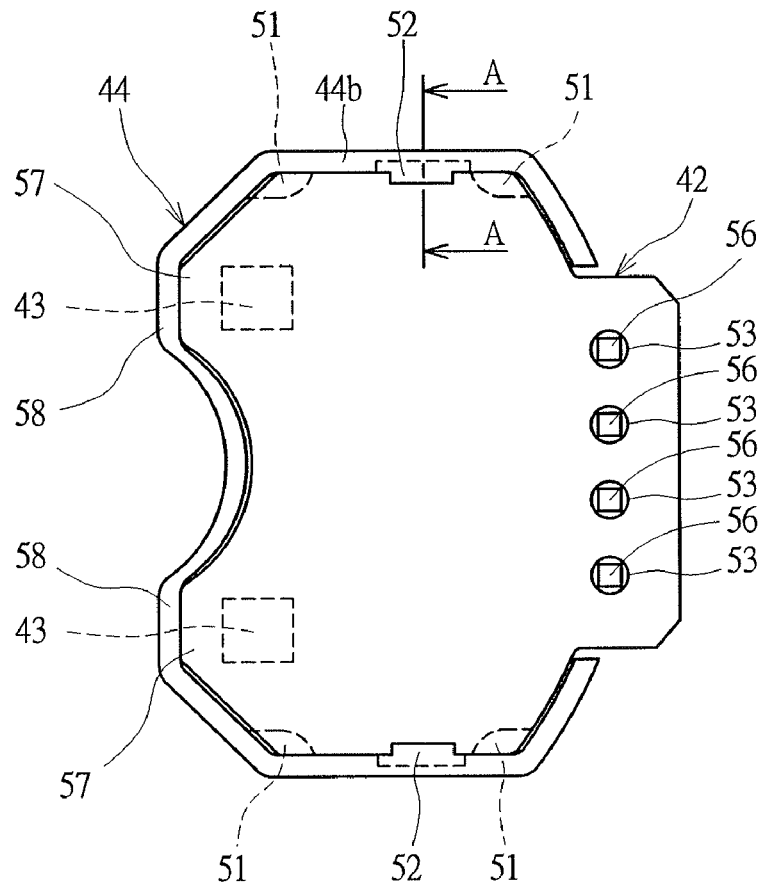
FIG. 9 is a front view that the sensor unit is viewed from the side of a sensor substrate.
Figure 10:
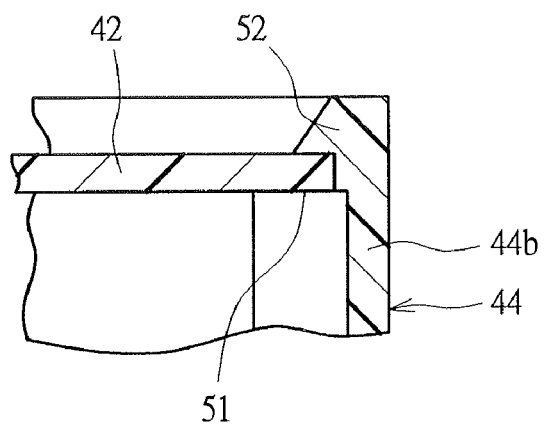
FIG. 10 is a cross sectional view cut along the A-A line in FIG. 9.

FIG. 9 is a front view that the sensor unit is viewed from the side of the sensor substrate. FIG. 10 is a cross sectional view cut along the A-A line in FIG. 9.

As is understood from FIGS. 7 and 8, four substrate-support bearing surfaces 51 positioned in the four corners of the case 44 are provided on the side wall portion 44b of the sensor case 44 to support the sensor substrate 42. Each substrate-support bearing surface 51 is formed at the same height, and the sensor substrate 42 is disposed on the substrate-support bearing surfaces 51 and positioned in the sensor case 44. A pair of claw portions 52 positioned on the sides of both side portions of the sensor substrate 42 are provided to the sidewall portion 44b of the sensor case 44. As shown in FIG. 10, the sensor substrate 42 is sandwiched between the claw portions 52 and the substrate-support bearing surfaces 51 and fixed to the sensor case 44. Owing to this, the sensor substrate 42 can be assembled to the sensor case 44 by only pressing the sensor substrate 42 into the sensor case 44, which can make the assembly work of the sensor unit 41 easy.

As shown in FIG. 9, four connection holes 53 in total, two connected to each power supply terminal (not shown) of each rotation sensor 43 and the other two connected to each detection signal output terminal (not shown) of each rotation sensor, are formed in line at regular intervals in the sensor substrate 42. Further, corresponding to the connection holes 53, a connection terminal unit for sensor 54 is provided to the attachment unit 45 of the brush holder 33 as shown in FIG. 6. The connection terminal unit for sensor 54 has a terminal support block 55 that is parallel to the case fixing unit 46 and integrally formed of a resin material with the brush holder 33. Four terminals for sensor 56 in total, two for supplying power to the rotation sensors 43 and the other two for transmitting detection signal from the rotation sensors 43, are provided in line at regular intervals, protruding from the terminal support block 55 in the axial direction of the armature shaft 18. Owing to this, when the sensor substrate 42 and the sensor case 44 are attached together to the case fixing unit 46 of the brush holder 33 in the axial direction of the armature shaft 18, each terminal for sensor 56 is inserted through the corresponding connection hole 53 of the sensor substrate 42. When each terminal for sensor 56 is inserted through the corresponding connection hole 53, each terminal for sensor 56 is fixed to the corresponding connection hole 53 by soldering. This allows each terminal for sensor 56 is electrically connected to the sensor substrate 42, that is, the rotation sensors 43.

As is described above, in the power window motor 11, the four terminals for sensor 56 are formed, protruding from the terminal support block 55 provided to the brush holder 33 in the axial direction of the armature shaft 18. Therefore, when the sensor unit 41 is attached to the brush holder 33 in the axial direction of the armature shaft 18, it is possible to connect each terminal for sensor 56 to the sensor substrate 42 easily. Accordingly, the attachment work of the sensor unit 41 to the power supply unit 31 becomes easy and the assembly workability of the power window motor 11 can be enhanced.

Since each terminal for sensor 56 protruding from the terminal support block 55 is disposed in line at regular intervals, the soldering work to fix these terminals for sensor 56 to the sensor substrate 42 can be made easy. Note that in the present embodiment, each terminal for sensor 56 is disposed on the terminal support block 55 in line; however, the disposition of the terminals for sensor 56 is not limited to the above and they may be disposed in a curved line about the axis of the armature shaft 18. In this case, the arrangement space for each terminal for sensor 56 is made small and downsizing of the brush holder 33 can be realized.

As shown in FIG. 9, a pair of positioning contact portions 57 each formed in a convex shape are formed on the sensor substrate 42, a pair of positioning side wall portions 58 corresponding to the positioning contact portions 57 are formed to the sensor case 44, and each terminal for sensor 56 is fixed to the corresponding connection hole 53 in a state that the positioning contact portions 57 of the sensor substrate 42 contact with the positioning side wall portions 58. This allows the sensor substrate 42 to be accurately positioned in the brush holder 33 via the sensor case 44, thereby making it possible to position the rotation sensors 43 at a desired position.

As shown in FIG. 1, a connector unit 61 is provided to the power window motor 11 to connect the power supply unit 31 and the sensor unit 41 to the control device 14. As shown in FIGS. 2 and 3, the connector unit 61 has a cover unit 61a in which a control device side connector 62 (refer to FIG. 1) on the side of the control device 14 is inserted/extracted. This cover unit 61a is integrally formed of a resin material with the brush holder 33 and a coupling unit 63 extending from the ring portion 33a of the brush holder 33. In other words, the cover unit 61a is connected to the brush holder 33 via the coupling unit 63 provided between the brush holder 33 and cover unit 61a, thereby integrating the connector unit 61 with the power supply unit 31.

As shown in FIG. 3, six connector terminals 64 are provided to the inside of the cover unit 61a. Two of the connector terminals 64 are used for supplying a driving current to the power supply unit 31, that is, to each brush 32, two are for supplying power to the rotation sensors 43, and the rest two are for transmitting detection signal from the rotation sensors. When the connector unit 61 is connected to the control device side connector 62, each connector terminal 64 is connected to the control device 14 via the control device side connector 62.

Two terminal members for power supply and four terminal members for rotation detection are embedded by insert molding in the inside of the cover unit 61a integrally molded with the brush holder 33 and the coupling unit 63 using a resin material. Each one end portion of the two terminal members for power supply protrudes from the cover unit 61a and composes the connector terminal 64 for supplying a driving current to each brush 32. The other end portion protrudes to the inner side of the side wall portion 33*b* of the brush holder 33 as shown in FIG. 3 and is electrically connected to the brush 32 via a corresponding current-carrying plate 65 disposed on the plane portion 33*c*. In other words, the connector unit 61 is connected to the power supply unit 31, that is, the brushes 32 by the two terminal members for power supply embedded in the resin brush holder 33. On the other hand, each one end portion of the four terminal members for rotation detection protrudes from the cover unit 61*a,* two of the end portions compose the connector terminals 64 for supplying power to the rotation sensors 43, and the other two compose the connector terminals 64 for transmitting detection signal from the rotation sensors 43. Further, the other end portions of the four terminal members for rotation detection protrude, respectively, from the terminal support block 55 of the connection terminal unit for sensor 54 in the axial direction of the armature shaft 18 and compose four terminals for sensor 56 in total, respectively, two for terminals for sensor 56 for supplying power to the rotation sensors 43 and the other two for terminals for sensor 56 for transmitting detection signal. In other words, the connector unit 61 is connected to the sensor unit 41, that is, the rotation sensors 43 by the four terminal members for rotation detection that are embedded in the resin brush holder 33.

Here, the brushes 32 are disposed toward one side of the axial direction of the armature shaft 18 in relation to the coupling unit 63, whereas the attachment unit 45, that is, the sensor unit 41 is disposed on the opposite side of the sandwiched coupling unit 63 to the brushes 32 in the axial direction of the armature shaft 18. Corresponding to this, the terminal members for power supply connected to the brushes 32 from the connector unit 61 via the coupling unit 63 extend from the coupling unit 63 to the plane portion 33*c* in the axial direction of the armature shaft 18, whereas the terminal members for rotation detection extend from the coupling unit 63 to the side opposite to the terminal members for power supply. This makes it possible to prevent each current-carrying member from overlapping with each other in the diameter direction of the armature shaft 18 and downsize the power supply unit 31.

Figure 11:
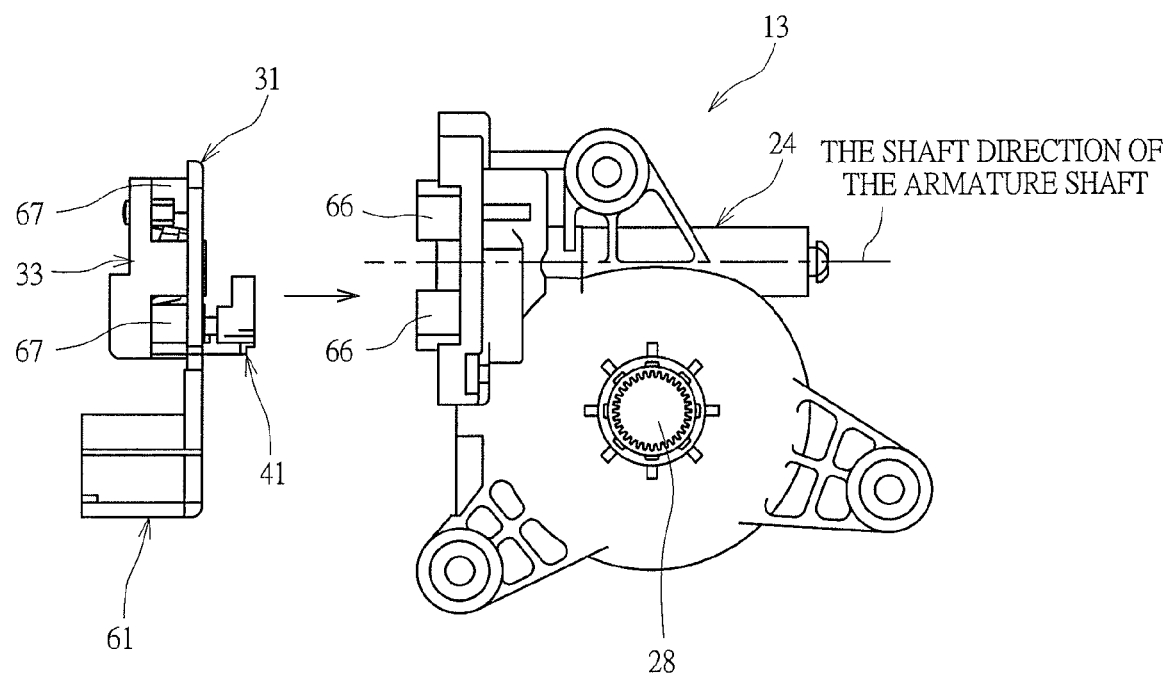
FIG. 11 is a detailed diagram to explain a method for equipping a power supply unit and the sensor unit to a gear case.
Figure 12:
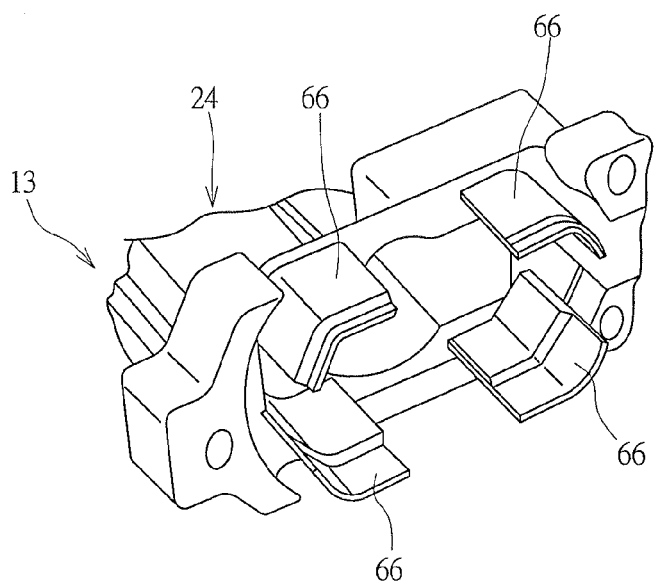
FIG. 12 is a perspective view representing a detail of the positioning wall shown in FIG. 11.
Figure 13:
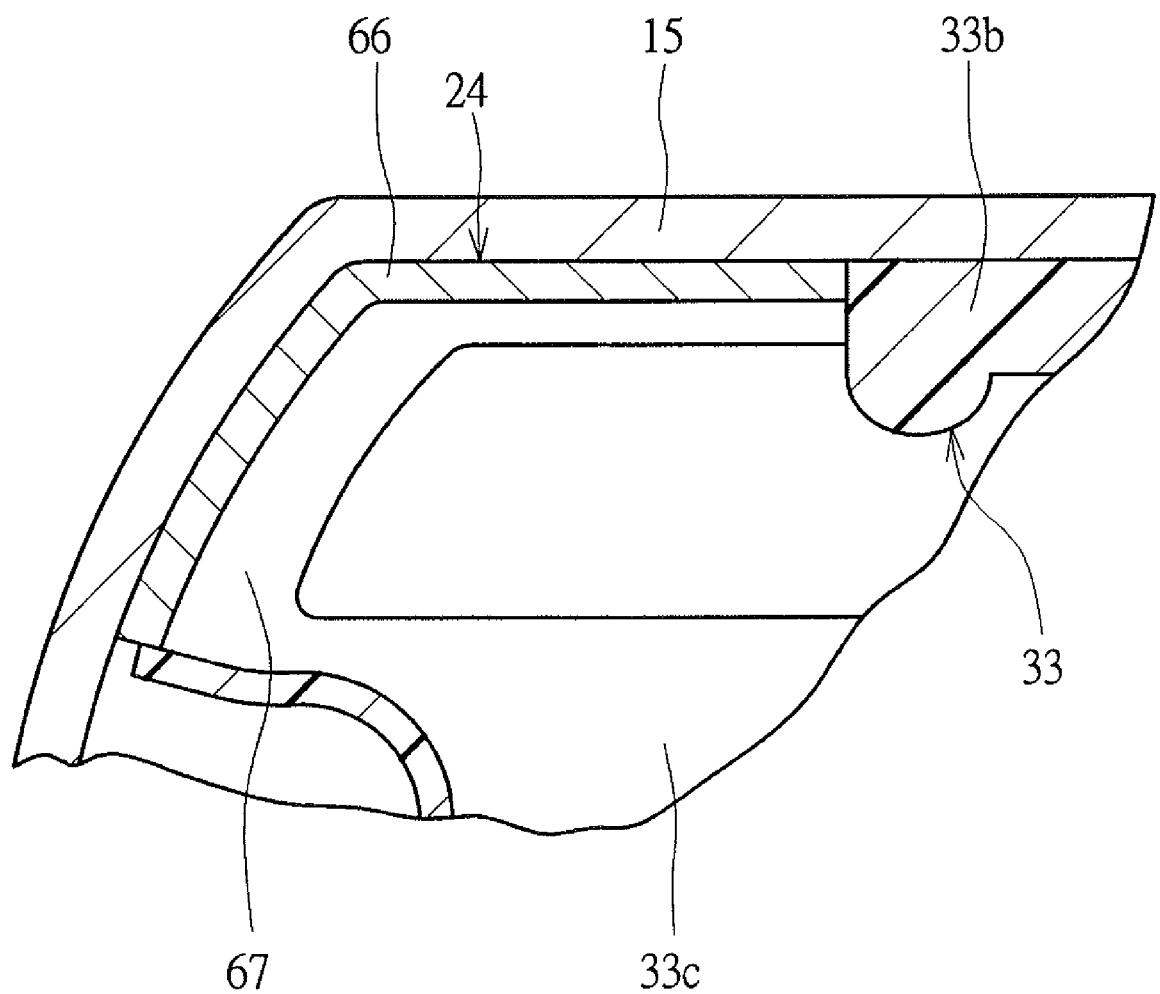
FIG. 13 is a cross sectional view representing an enlarged engagement portion of the positioning wall with a motor yoke.

FIG. 11 is a detailed diagram to explain a method for equipping the power supply unit and the sensor unit to the gear case. FIG. 12 is a perspective view that represents a detail of the positioning walls shown in FIG. 11. FIG. 13 is a cross sectional view that represents an enlarged engagement portion of the positioning wall with the motor yoke.

A method for assembling the power window motor 11 having the structure described above will be explained next. First, as at a prior step, the armature 17, magnets 16, and the like are assembled in the inside of the motor yoke 15, and further, the worm wheel 27 and the output shaft 28 are assembled in the inside of the gear case 24 to make the decelerator 13. Furthermore, the terminal members for power supply and the terminal members for rotation detection are insert molded with the use of a resin material to form the brush holder 33. The brushes 32 and the like are assembled to this brush holder 33 to make the power supply unit 31. Still further, the rotation sensors 43 are mounted to the sensor substrate 42 and the sensor case 44 is formed by resin molding.

Next, as shown in FIG. 5, the sensor case 44 is attached to the attachment unit 45 of the brush holder 33 in the axial direction of the armature shaft 18, then the sensor substrate 42 is assembled to the sensor case 44, and each terminal for sensor 56 is fixed to the sensor substrate 42 by soldering. This allows the sensor unit 41 to be assembled to the power supply unit 31, and the power supply unit 31 and the sensor unit 41 become one unit.

The sensor substrate 42 is assembled to the sensor case 44 after the sensor case 44 is fixed to the brush holder 33 in the present embodiment; however, this step is not limited to the above, and the sensor unit 41 may be attached to the brush holder 33 after the sensor substrate 42 is assembled to the sensor case 44 in advance.

Next, as shown in FIG. 11, the power supply unit 31 attached with the sensor unit 41 in advance is equipped to the gear case 24 in the axial direction of the armature shaft 18. At this time, as shown in FIG. 12, four positioning walls 66 in an elbow shape in cross section are provided in corresponding four corners of the motor yoke 15 in an oval shape in cross section, and these positioning walls 66 are assembled to the gear case 24 so as to be disposed at corresponding notches 67 formed in the side wall portion 33*b* of the brush holder 33. The motor yoke 15 is guided to be inserted so as to come into contact with the positioning walls 66 of the gear case 24 and then assembled. At this time, the side wall portion 33*b* of the brush holder 33 and the motor yoke 15 are in a state of loose insertion. As shown in FIG. 13, this allows the gear case 24 to contact directly with the motor yoke 15 at the positioning walls 66 without through the brush holder 33 and be accurately positioned in relation to the motor yoke 15.

In this manner, the power supply unit 31 is equipped to the gear case 24 in the axial direction of the armature shaft 18 in a state that the sensor unit 41 is attached in the axial direction of the armature shaft 18 in advance. Therefore, the power supply unit 31 and the sensor unit 41 can be equipped to the gear case 24 as one unit, thereby making it possible to enhance the assembly workability of the power supply unit 31 and the sensor unit 41 to the gear case 24.

In the power window motor 11, the sensor unit 41 can be attached to the power supply unit 31 easily by inserting the sensor unit 41 in the attachment direction to the attachment unit 45 provided to the power supply unit 31, and therefore, the assembly work of the power window motor 11 can be made easier.

Further, the attachment unit 45 for attaching the sensor unit 41 to the power supply unit 31 comprises the case fixing unit 46 and the connection terminal unit for sensor 54 each protruding in the axial direction of the armature shaft 18, the assembly direction of the sensor unit 41 to the power supply unit 31 is set to the axial direction of the armature shaft 18, and the assembly direction of the power supply unit 31 to the gear case 24 is set to the axial direction of the armature shaft 18. Therefore, the assembly direction of the sensor unit 41 to the power supply unit 31 and the assembly direction of the power supply unit 31 to the gear case 24 become the same direction, which can make the assembly of these members enhanced.

Furthermore, in the power window motor 11, the connector unit 61 is integrally formed with the power supply unit 31 as shown in FIG. 2, and therefore, the connector unit 61 can be fixed to the gear case 24 by only attaching the power supply unit 31 to the gear case 24. Thus, not only is the structure of the power window motor 11 simplified but also that of the connector unit 61 is made simple, thereby making the assembly work easy.

Still further, in the power window motor 11, the sensor unit 41 is provided offset from the brushes 32 in the axial direction of the armature shaft 18. Therefore, the sensor unit 41 and the brushes 32 are disposed without overlapping with each other in the diameter direction of the armature shaft 18. This makes the power supply unit 31 downsized. Particularly, when the sensor unit 41 is disposed on the opposite side of the sandwiched coupling unit 63 to the brushes 32 in the axial direction of the armature shaft 18, the connection structure of the connector unit 61 to the power supply unit 31 and the sensor unit 41 via the coupling unit 63 is simplified, thereby making it possible to downsize the power supply unit 31.

Still further, in the power window motor 11, the brush holder 33 is formed of a resin material and the terminal members for power supply and the terminal members for rotation detection are embedded in the brush holder 33. Therefore, the structures of the connector unit 61 and the power supply unit 31 are simplified and the cost of the power window motor 11 can be reduced.

The present invention is not limited to the aforementioned embodiments, and it is needless to say that various changes may be made without departing from the spirit of the present invention. For example, the present invention is applied to the power window motor 11 in which the decelerator 13 is attached to the motor main body 12 in the present embodiments. However, the application is not limited to the present embodiments, and the present invention may be applied to an electric motor without the decelerator 13.

Still further, in the present embodiments, Hall elements are used as the rotation sensors 43; however, the sensor is not limited to the rotation sensor 43 and, for example, other sensors such as MR (magnetoresistive) sensor may be used.

According to one aspect of the present invention, the connector unit is integrally formed with the power supply device, and the rotation detector is attached to the power supply device in advance before the power supply device is equipped to the gear case, which allows the power supply device, the rotation detector, and the connector unit to be equipped to the gear case as one unit. Therefore, the assembly work of the electric motor can be made easy. Since the assembly direction of the rotation detector to the power supply device and the assembly direction of the power supply device to the motor case are matched with each other, the assembly work of these members to the motor case can be made easy.

Further, according to another aspect of the present invention, the rotation detector is disposed offset from the power supply unit in the axial direction of the armature shaft, and therefore the rotation detector and the power supply unit are disposed without overlapping with each other in the diameter direction of the armature shaft, which makes it possible to downsize the power supply device. Particularly, when the rotation detector is disposed on the opposite side of the sandwiched coupling unit to the power supply unit in the axial direction of the armature shaft, the connection structure of the connector unit to the power supply device and the rotation detector via the coupling unit is simplified, thereby making it possible to downsize the power supply device.

Furthermore, according to still another aspect of the present invention, not only is the holder formed of a resin material but also the terminal members for power supply and the terminal members for rotation detection are embedded in the holder. This makes it possible to simplify the structures of the connector unit and the power supply device, thereby reducing the cost of the electric motor.

Still further, according to still another aspect of the present invention, the end portions of the terminal members for rotation detection protrude from the attachment unit of the holder in the axial direction of the armature shaft. Therefore, when the rotation detector is attached to the power supply device, it is possible to connect the terminal members for rotation detection and the rotation detector easily. This allows the assembly workability of the electric motor to be enhanced more.

The present invention is utilized when the electric motor in which an armature provided with an armature shaft is rotatably accommodated in the inside of a motor case is manufactured easily.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. An electric motor in which an armature provided with an armature shaft is rotatably accommodated in the inside of a motor case, comprising:
   a power supply device that is equipped in the motor case in the axial direction of the armature shaft and supplies a driving current to the armature;
   a rotation detector that is accommodated in the motor case together with the power supply device and detects rotation of the armature shaft; and
   a connector unit that is integrally formed with the power supply device, connected to a connector on the side of a control device, and connects the power supply device and the rotation detector to the control device,
   wherein the power supply device is equipped to the motor case after the rotation detector is attached to the power supply device in advance,
   wherein the armature includes a commutator fixed to the armature shaft and the power supply device includes a pair of brushes which slidably contact with the outer circumferential surface of the commutator,
   wherein the power supply device includes a holder that is fixed to the motor case and holds the brushes,
   wherein an attachment unit which has a locking piece including a claw portion is integrally formed with the holder and is disposed offset from the brushes in the axial direction of the armature shaft, and
   wherein the rotation detector is attached to the attachment unit by the engagement with the claw portion thereby the positioning of the rotation detector is set in the axial direction of the armature shaft.

2. The electric motor according to claim 1, wherein a coupling unit is provided between the holder and the connector unit, and the attachment unit is disposed on the opposite side of the sandwiched coupling unit to the power supply unit in the axial direction of the armature shaft.

3. The electric motor according to claim 1, wherein the holder is formed of a resin material, and terminal members for power supply that connect the connector unit and the power supply device and terminal members for rotation detection that connect the connector unit and the rotation detector are embedded in the holder.

4. The electric motor according to claim 2, wherein the holder is formed of a resin material, the terminal members for power supply that connect the connector unit and the power supply device and the terminal members for rotation detection that connect the connector unit and the rotation detector are embedded in the holder.

5. The electric motor according to claim 3, wherein when end portions of the terminal members for rotation detection protrude from the attachment unit in the axial direction of the armature shaft and the rotation detector is attached to the attachment unit in the axial direction of the armature shaft, the terminal members for rotation detection are electrically connected to the rotation detector.

6. The electric motor according to claim 4, wherein when the end portions of the terminal members for rotation detection protrude from the attachment unit in the axial direction of the armature shaft and the rotation detector is attached to the attachment unit in the axial direction of the armature shaft, the terminal members for rotation detection are electrically connected to the rotation detector.

7. A method for manufacturing an electric motor including an armature that is provided with a armature shaft, a motor case that rotatably accommodates the armature, a power supply device that supplies a driving current to the armature, a rotation detector that detects rotation of the armature shaft, and a connector unit that is integrally formed with the power supply device, connected to a connector on the side of a control device, and connects the power supply device and the rotation detector to the control device, the method comprising:

a step of attaching the rotation detector to the power supply device in the axial direction of the armature shaft; and a step of equipping the power supply device attached with the rotation detector in advance to the motor case in the axial direction of the armature shaft, wherein the armature includes a commutator fixed to the armature shaft and the power supply device includes a pair of brushes which slidably contact with the outer circumferential surface of the commutator, wherein the power supply device includes a holder that is fixed to the motor case and holds the brushes, wherein an attachment unit which has a locking piece including a claw portion is integrally formed with the holder and is disposed offset from the brushes in the axial direction of the armature shaft, and wherein the rotation detector is attached to the attachment unit by the engagement of the claw portion thereby the positioning of the rotation direction is set in the axial direction of the armature shaft.

* * * * *